United States Patent [19]

Chitil

[11] Patent Number: 4,473,399
[45] Date of Patent: Sep. 25, 1984

[54] METHOD OF SUPPLYING COAL GAS TO A SMELTING WORKS

[75] Inventor: Manfred Chitil, Krefeld-Bockum, Fed. Rep. of Germany

[73] Assignee: Klöckner-Werke Aktiengesellschaft, Duisburg, Fed. Rep. of Germany

[21] Appl. No.: 495,094

[22] Filed: May 16, 1983

[30] Foreign Application Priority Data

May 25, 1982 [DE] Fed. Rep. of Germany ....... 3219562

[51] Int. Cl.³ .............................................. C22B 5/12
[52] U.S. Cl. .......................................... 75/91; 48/92; 48/190; 62/9
[58] Field of Search .............................. 75/34, 42, 91; 48/197 R, 190, 210, 92; 62/9, 10

[56] References Cited

U.S. PATENT DOCUMENTS 3,854,896 12/1974 Switzer ................................. 48/210
4,363,654 12/1982 Frederick et al. ....................... 75/34
4,388,084 6/1983 Okane et al. ..................... 48/197 R

FOREIGN PATENT DOCUMENTS 2733790 2/1978 Fed. Rep. of Germany.
2520938 3/1980 Fed. Rep. of Germany.
2952434 7/1980 Fed. Rep. of Germany.
3031680 3/1982 Fed. Rep. of Germany.
3133575 3/1983 Fed. Rep. of Germany.

Primary Examiner—M. J. Andrews
Attorney, Agent, or Firm—Watson, Cole, Grindle & Watson

[57] ABSTRACT

A coal gas supply method converts a carbon carrier in a reactor into a coal gas by the addition of oxygen and feeds the coal gas to fuel consumers. To ensure a continuous fuel supply to the fuel consumers during the coal gasification process, a branch current of the coal gas produced is liquefied and stored. At the same time the oxygen stored in liquid form is drawn from a tank, evaporated and used in the reactor. If there is a breakdown in the coal gasification process, the stored quantity of coal gas is evaporated gradually and fed to the consumers. At the same time, oxygen drawn from an oxygen inlet pipe is liquefied and stored. Instead of coal gas, another fuel gas such as natural gas can also be used.

13 Claims, 2 Drawing Figures

METHOD OF SUPPLYING COAL GAS TO A SMELTING WORKS

BACKGROUND OF THE INVENTION

1. Field of the Invention

This invention relates to a method for supplying coal gas to a large industrial consumer, and more particularly to supplying coal gas to a smelting works, wherein a coal gas is produced in an iron bath reactor from solid or liquid carbon carriers by the addition of oxygen drawn in gaseous form from an oxygen line. The coal gas so produced is conducted to consumers such as industrial furnaces, heaters and pickling solutions. The invention also relates to a method for the coal gas supply and fuel gas supply in a smelting works or in another large consumer of fuel gas.

2. Description of the Prior Art

Methods for coal gasification in an iron bath reactor on which this invention is based are, for example, known from West German Patent No. 2,520,938 and West German Unexamined application Nos. 30 31 680 and 31 33 575. Furthermore, a coal gasification method is described in West German Unexamined application No. 29 52 434. The use of coal gases produced from such methods for smelting-works-owned or external consumers is described in West German Unexamined application No. 27 33 790. According to this method, vapor is produced from the sensible heat contained in the generated coal gas and with which a generator is operated. The purified, scrubbed, and cooled coal gas is optionally available to consumers in the smelting works, and the like, in addition to being used in an iron bath reactor for injection. To this end, the coal gas is stored in a gas tank.

If there is sufficient coal gas production, all the smelting-works-owned gas consumers, such as, for example, industrial furnaces, power stations, mordants, etc., can be operated with coal gas instead of with natural gas or instead of with petroleum as typically used in the past. However, in the method known from West German Unexamined application No. 27 33 790 for the coal gas supply of a smelting works, a continuous supply is not warranted. Coal gas production in an iron bath reactor is necessarily subject to downtime and cold time interruptions. After a certain time, the iron bath has to be emptied and the reaction vessel relined. During this downtime period, coal gas production in the iron bath reactor is not possible.

In order to be able to maintain a continuous coal gas supply, an interconnecting gas supply network with other smelting works or with other coal gas producers would be required, or several independent coal gas producing units would have to be available in the smelting works. However, such interconnecting supply networks are expensive. Moreover, several iron bath reactors are less economical than a large reactor which is sufficient for all the quantity of coal gas required. Therefore, in the final analysis, the coal gas supply of a smelting works or of another large consumer of coal gas typically will occur in an insular operation, or "in house" as is usually the case with a blast-furnace gas supply.

Thus, in accordance with the teachings of West German Unexamined application No. 27 33 790, the connected external gas consumers must be supplied from a quantity of coal gas stored in a gas tank. However, quantities of coal gas that become available or are required are very large. Taking into consideration that a smelting works aims at a coal gas production rate of approximately 120,000 $m^3$/hr., gas tanks are needed with extremely high volumes and which therefore require a large capital outlay and take up considerable space. During a disturbance in the smelting process lasting more than a few hours and during repair work on the unit, stocking up the amount of coal gas needed by the external consumers during the disturbance in accordance with the teachings of West German Unexamined application No. 27 33 790 is not economically feasible.

Therefore, during smelting works downtime the fuel consumers are normally supplied within the framework of an emergency supply by means of other energy carriers, more particularly natural gas. However, during such downtime there is an obvious difference in the consumption of natural gas. That is, over relatively long periods of time during active smelting works operations practically no natural gas is consumed, whereas during downtimes in coal gas production considerable quantities of natural gas are needed. Under these conditions, natural gas is a relatively expensive energy carrier. Moreover, separate gas lines or separate burners are needed. Thus, a switch must be made from coal gas to natural gas on the premises of the fuel consumer. Although a natural gas reservoir that would enable a virtually continuous fuel consumption would have relatively small dimensions compared to a coal gas reservoir, it still would have to be so large and, hence, so expensive as to be uneconomical. Storing in underground caverns is possible only under certain geological conditions which are not present at every site. In either case, in addition to the high costs in terms of capital outlay, considerable energy costs are incurred for the compression work for storing.

SUMMARY OF THE INVENTION

Based on the known method of supplying coal gas or fuel gas to large energy consumers and more particularly to a smelting works, the object of the invention is to provide a method of fuel supply wherein a continuous gas supply to connected, external fuel consumers is possible and economically feasible. This object is achieved in accordance with the method set forth below.

BRIEF DESCRIPTION OF THE DRAWINGS

Various other objects, features and attendant advantages of the present invention will be more fully appreciated as the same become better understood from the following detailed description when considered in connection with the accompanying drawings, in which like reference characters designate like or corresponding parts through the several views and wherein.

DETAILED DESCRIPTION OF THE PREFERRED EMBODIMENT

Figure 1:
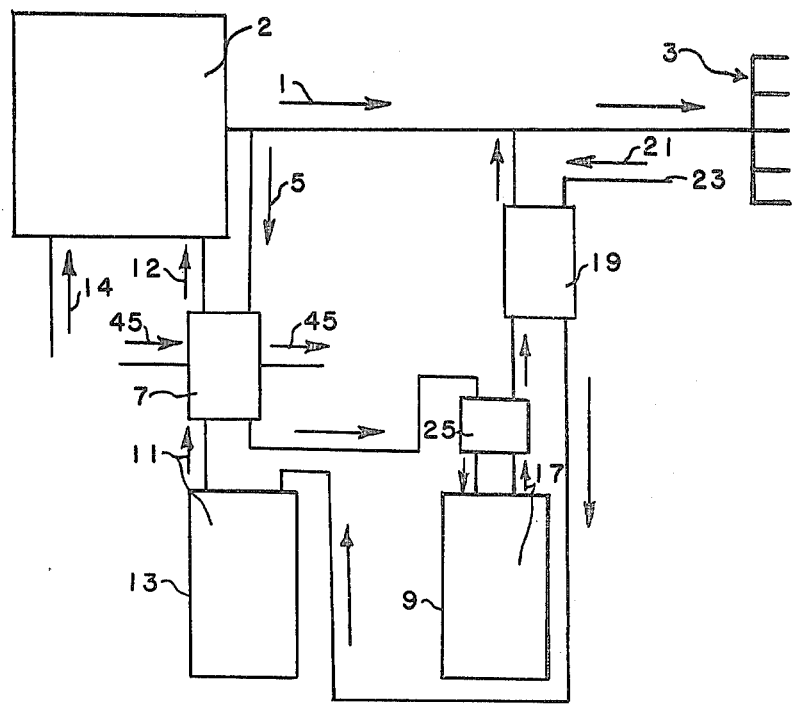
FIG. 1 is a schematic diagram of a first embodiment of the invention.

It can be appreciated from FIG. 1 that during the coal gasification period only a branch current 1 of the coal gas produced in reactor 2 is fed to the fuel consumers 3 while another branch current 5 of the coal gas produced is liquefied at, for example, heat exchanger 7, and stored in tank 9. Oxygen 11 stored in liquid form is drawn from a tank 13, heated, for example, in heat exchanger 7, until the gas phase is reached, and fed as a gas 12 to the iron bath reactor 2 during the gasification period. The carbon carriers required for the gasification are introduced into the iron bath reactor at 14. The heat needed to heat the oxygen 11 is extracted from the coal gas 5 to be liquefied, for example, in heat exchanger 7.

During a breakdown or downtime in the coal gasification process, a liquefied, stored quantity of liquid coal gas 17 is gradually heated, for example, in heat exchanger 19, and supplied to the consumers 3 as a gas. Gaseous oxygen 21 extracted directly from an oxygen inlet pipe 23 is liquefied, for example, in heat exchanger 19, and stored in tank 13. Heat is extracted from the gaseous oxygen 21 to be liquefied in order to heat the liquefied coal gas 17. Thus, a continuous fuel gas supply is accomplished by the method of the invention.

Figure 2:
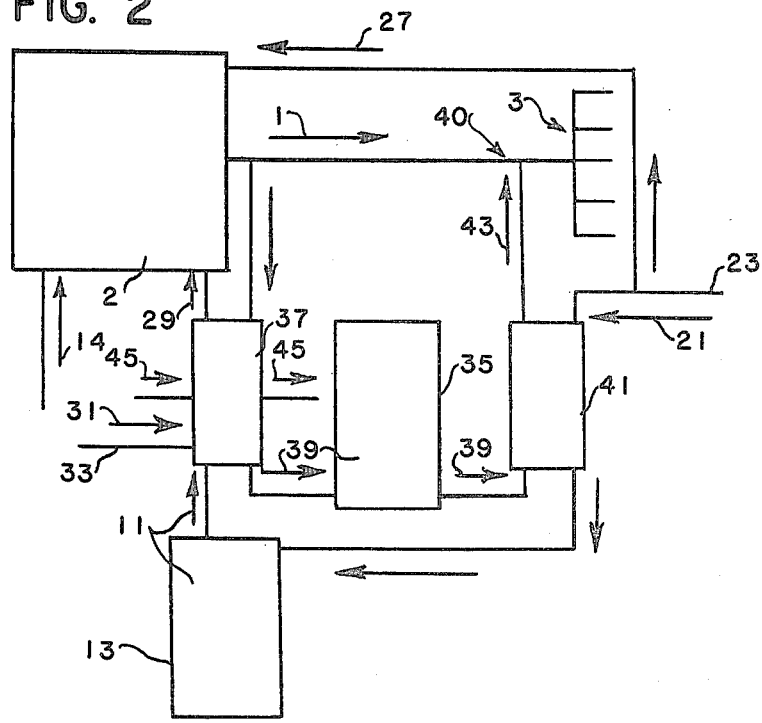
FIG. 2 is a schematic diagram of a second embodiment of the invention.

An alternate method is depicted in FIG. 2. During the coal gas production period of this alternate method, only a branch current 27 of the actually needed oxygen is drawn directly from the oxygen inlet pipe 23 into reactor 2, while another branch current 29 is obtained by gradually heating oxygen 11 stored in liquid form in tank 13. Fuel gas 31 drawn from a fuel gas inlet pipe 33, more particularly a natural gas inlet pipe, is liquefied and stored in tank 35. The heat needed for heating the oxygen 11 stored in liquid form is extracted from the fuel gas 31 to be liquefied in, for example, heat exchanger 37. In the case of a breakdown in the coal gasification process, the quantity of liquefied fuel gas 39 is gradually heated in, for example, heat exchanger 41 and supplied to the consumers 3 in gaseous form at 40. Oxygen 21 drawn from the oxygen inlet pipe 23 is liquefied via heat exchanger 41 and stored in tank 13. Heat is extracted from the oxygen 21 which is to be liquefied in order to heat the liquid fuel gas 39 to produce gaseous fuel gas 43.

It is advantageous if the fuel gas is chosen such that the quantity of fuel gas 31 which is liquefied every hour and fed to the gas tank 35 is equal to the quantity of oxygen 11 drawn from the oxygen tank 13 for its liquefaction.

According to the teachings of this invention, large volume tanks are avoided by at least partially liquefying the coal gas or fuel gas and storing it in liquid form. The gas volume shrinks during liquefaction approximately by a factor of 725 so that substantially smaller storage tanks suffice for the quantities of gas required. Although the coal gas or fuel gas stored in liquid condition must be cooled and energy must be expended for this cooling, the quantities of such energy required remain within limits because the heat needed to gasify the stored liquid oxygen 11 is supplied by the coal gas 5 in FIG. 1 or fuel gas 31 in FIG. 2 to be cooled and liquefied. The coal gas 5 or fuel gas 31 delivers its thermal energy in a heat exchange process to the liquid oxygen 11 so that the liquid oxygen is heated and becomes gaseous, and the coal gas or fuel gas cools considerably.

During a breakdown in the coal gasification process, the coal gas 5 or fuel gas stored in liquid form in, for example, tank 35, is gradually heated and supplied to the individual consumers 3.

A heat exchange process is thus used for heating purposes wherein cold, liquid coal gas or fuel gas is heated through a heat exchange with gaseous oxygen that is to be stored. Therefore, in combination with the storing of oxygen, a surprisingly energy-saving possibility is provided for storing the coal gas or fuel gas in the inherently expensive liquid form. The air-separating installation can, but should not, be located near the coal gas installation.

One particular advantage of the method according to the invention is that the oxygen consumption out of an oxygen inlet pipe such as pipe 23 is practically free from fluctuations. A known fact is that air separation costs are low if the load of the air separating installation used for this purpose on an electric network or on another energy supplier network remains constant. This is possible in the case of a continuous oxygen consumption as realized by the invention.

The liquefaction according to the invention of another fuel gas, more particularly of natural gas, instead of the self-produced coal gas also has the advantage that this fuel gas can be purchased in gaseous form continuously and in equal quantities over time and can thus be bought at a reasonable price. Moreover, the liquefaction of natural gas occurs at relatively higher absolute temperatures than the liquefaction of coal gas, so that it can be carried out more simply than the liquefaction of coal gas.

In coal gas, a high hydrogen content is desirable. Typically, the hydrogen content of such gas lies between 10 and 40%. Since hydrogen can only be liquefied at very low temperatures, a relatively low temperature is needed to cool the coal gas into the liquid phase. The higher the percentage of hydrogen in the coal gas, the closer to 21° K., the liquefaction point of hydrogen, the temperature of the coal gas must be reduced.

Therefore, a further development of the invention provides for storing of the hydrogen constituent of the coal gas in gaseous form, preferably under pressure, but storing the coal gas constituents that boil at relatively high temperatures, such as CO, in liquid form. Preferably, this can be done in one and the same tank, because the still gaseous hydrogen within the tank also has a low temperature. In this way, it is also possible to draw off the individual constituents of the coal gas separately from one another. However, such constituents can also be supplied in combination as a mixture to the consumers during a downtime period. This has the advantages that no second gas pipe network needs to be used and switching to the individual consumers is unnecessary because the fuel gas remains the same. If, however, hydrogen is not mixed with carbon, then a practically pure high-grade fuel gas $H_2$ can be supplied and applied in many ways. Further, in case of a mixture, the hydrogen and carbon can be especially blended for the consumer and a balance can be achieved through the combustion plants.

Advantageously, during cooling, the coal gas constituents such as $H_2O$, $H_2S$ and $CO_2$ which pass into the solid aggregate state above the coal gas liquefaction temperature are separated in a suitable device such as a molecular sieve or Revex heat exchanger at a temperature slightly below their respective solidification points. In this way, the coal gas is freed from these ballast materials and these materials can be separated and utilized as desired. Thus, $CO_2$ can advantageously be used to cool the OBM nozzles employed in the iron bath reactor. Of particular advantage is the separation of $H_2S$ because in this way the coal gas becomes practically free of sulphur and is suitable for use, for example, in the chemical industry. As a result, the coal gas, which has been liquefied temporarily or brought at least to a low temperature needed to freeze out $H_2S$, has a lower sulphur content than the coal gas supplied to consumers in conventional coal gasification processes.

Another possibility is to cool all of the coal gas produced during the gasification period to a temperature at which $H_2O$, or $CO_2$ or $H_2S$ separate in solid form. The heat which is to be extracted from the coal gas for cooling may be supplied to the coal gas for reheating after the coal gas has once been cooled as shown at 25 in FIG. 1. Furthermore, the coal gas produced in the reactor may, after being liquefied, be compressed and subsequently reheated until the gas phase is reached. The heat extracted from the coal gas for its liquefaction may be used to heat the coal gas after its liquefaction and compression.

In addition to the coal gas production in iron bath reactors, the process according to the invention is also suitable for other gasification processes for solid or liquid fuels, such as for the fluid-bed process and the fixed-bed process.

Cooling the coal gas produced to still lower temperatures beyond the temperature for separating $H_2S$ in order to bring the coal gas to the liquid phase is very useful, because in this condition the coal gas can be compressed with considerable savings in energy. The heat to be extracted from the coal gas 5, as shown in FIG. 1, in order to cool it to liquefaction is released to the coal gas 17 that is to be reheated to the gasification temperature after a pressure increase, during which, again, a heat exchanger 25 is used. However, since the reheated coal gas necessarily has a lower temperature than the coal gas prior to liquefaction and compression, a device is proposed for cooling the coal gas to dissipate excess heat. This device may, for example, be a decompression stage device.

The main advantage of the alternating storage according to the invention between coal gas or fuel gas and oxygen lies in energy savings. In the method according to the invention, the quantity of heat present at low temperature is held as constant as possible so that only insulation losses, frictional losses, etc. must be replaced. Consequently, the method according to the invention is implemented most favorably if the quantity of heat to be extracted from the oxygen per unit of time in order to store it in liquid form is as near as possible to the quantity of heat that must be fed to the fuel gas or coal gas to evaporate it to room temperature or close thereto. In this way, it is ensured that the "quantity of cold" or energy balance present between oxygen and fuel gas or coal gas alternates back and forth without being lost, that is, without energy loss. In this case, one must use the conditions of the coal gas production process as a starting point.

For example, with coal gasification in an iron bath, to gasify one ton of coal, typically 600 $Nm^2$ of oxygen is required to obtain 2,000 $Nm^3$ of coal gas that has an energy content of 5.6 Gcal. It is very useful if the quantity of heat to be extracted from this 2,000 $Nm^3$ of coal gas in order to liquefy it corresponds to the quantity of heat that must be fed to 600 $Nm^3$ of oxygen in order to heat the oxygen from the liquid state in which it is stored to the usage temperature, particularly, ambient temperature. Since the liquefaction of coal gas, due to the very low liquidus temperatures of CO and particularly $H_2$ requires a large amount of heat to be extracted from the gas which in turn consumes large "quantities of cold", a heat balance is not achieved despite the slightly lower specific heat of the coal gas compared to oxygen. That is to say, a lesser "quantity of cold" is required to liquefy 600 $Nm^3$ oxygen.

Fuel gases, such as natural gas, can be liquefied at temperatures around $-50°$ C. Moreover, fuel gases have a higher calorific value than coal gas so that, in accordance with the ratio of the calorific values, less than 2,000 $Nm^3$ of natural gas must be stored in order to release the same quantity of heat to the consumer as an equivalent volume of coal gas. It would be useful if a fuel gas, particularly natural gas, could be chosen which, in a quantity corresponding to the calorific value of 2,000 $Nm^3$ of coal gas, requires the same quantity of heat to bring it from the temperature in the reservoir in which it is stored in liquid form to a temperature near ambient temperature as the quantity of heat needed in order to bring 600 $Nm^3$ of oxygen to a temperature near ambient temperature. The quantities of heat can also be equalized by cooling the quantity of oxygen or the quantity of fuel gas below the liquidus temperature, so that an additional "quantity of cold" can be absorbed from it.

In practice, at least two gases such as two fuel gases or one fuel gas and one coal gas are mixed together in order to be able to adapt the heat balance with respect to the "quantity of cold" and at the same time with respect to the calorific value to the operation-induced variations. For example, a liquid mixture of fuel gas and coal gas may be stored in a tank whose mixture ratio is chosen such that the quantity of heat which shall be extracted from the quantity of gas mixture which is liquefied every hour and fed to the tank is equal to the quantity of heat which shall be fed every hour to the quantity of oxygen drawn from the oxygen tank for its liquefaction.

Of particular advantage is the balance of the two "quantities of cold" between the oxygen stored in liquid form and the fuel gas or coal gas stored in liquid form if the storage temperatures are the same. This too can be achieved by a suitable mixture of gases, such as fuel gas and coal gas. If the storage temperatures are the same, there is no need for heat exchange machines which, for example, in order to liquefy oxygen, convert the "quantity of cold" of the fuel gas stored at $-50°$ C. into a "quantity of cold" with a temperature of approximately $-200°$ C. In this way, the necessarily resulting conversion losses are avoided.

Another variation of the present invention may include absorbing or delivering the difference between the quantity of heat needed to heat the quantity of oxygen drawn every hour from the oxygen tank and stored in liquid form, and the quantity of heat which shall be extracted every hour from the quantity of fuel gas or coal gas fed to the tank, by another gas, e.g., nitrogen, as shown in FIGS. 1 and 2 by reference numeral 45. It is desirable to store the coal gas, fuel gas, or gas mixture in liquid form at the same temperature as that of the liquid oxygen and, optionally, as that of the other gas, e.g., nitrogen.

In conclusion, a balance between the "quantities of cold" can also be achieved by introducing an additional gas such as oxygen, which is not consumed itself, whose quantity thus remains constant and which absorbs the excess quantities of heat. Thus, it is liquefied or heated simultaneously or in anti-phase with the oxygen.

What is claimed as new and desired to be secured by Letters Patent of the United States is:

1. A method for continuously supplying coal gas to a plurality of coal gas-consuming means in a smelting works having a coal gas gasification period and a downtime period and using an iron bath reactor for producing said coal gas via coal gasification of solid or liquid carbon carriers comprising coal, a tank for storing liquefied oxygen, said tank having an inlet pipe for receiving said liquefied oxygen and an outlet pipe for supplying gaseous oxygen to said iron bath reactor, storage means for storing said coal gas, and wherein said method comprises:

supplying a first portion of said coal gas produced during said gasification period to said plurality of coal gas-consuming means;

liquefying a second portion of said coal gas produced during said gasification period to form a liquefied coal gas by extracting heat from said second portion of said coal gas;

storing said liquefied coal gas in said storage means;

drawing said liquefied oxygen from said tank during said gasification period;

heating said liquefied oxygen drawn from said tank with said heat extracted from said second portion of said coal gas until said gaseous oxygen is formed during said gasification period;

feeding said gaseous oxygen to said iron bath reactor during said gasification period;

supplying oxygen in gaseous form through said inlet pipe during said downtime period;

liquefying said oxygen in gaseous form to produce said liquefied oxygen by extracting heat from said oxygen in gaseous form during said downtime period;

storing said liquefied oxygen in said tank during said downtime period;

heating gradually said liquefied coal gas with said heat extracted from said oxygen in gaseous form during said downtime period so as to form gasified coal gas; and supplying said gasified coal gas during said downtime period to said plurality of consuming means.

2. The method according to claim 1 wherein said coal gas comprises a hydrogen constituent stored in gaseous form and a plurality of constituents that boil at relatively high temperatures with respect to said hydrogen constituent, and wherein said method further comprises:

storing said plurality of constituents in liquid form; and mixing said plurality of constituents in liquid form with said hydrogen constituent during said downtime period.

3. The method according to claim 2 further comprising storing said hydrogen constituent under pressure with said plurality of constituents in said storage means.

4. The method according to claim 2 further using separating means and wherein said coal gas is liquefied at a predetermined liquefaction temperature such that at least one of said plurality of constituents of said coal gas solidifies above said liquefaction temperature to form a solid aggregate and wherein said method further comprises separating said solid aggregate from said liquefied coal gas with said separating means.

5. The method according to claim 1 wherein said coal gas comprises a plurality of constituents including $H_2O$, $CO_2$ and $H_2S$ and wherein said method further comprises:

cooing said coal gas during said gasification period to a predetermined temperature by removing a quantity of heat therefrom such that at least one of said plurality of constituents solidifies; and transferring said quantity of heat removed from said coal gas back to said coal gas for reheating said coal gas after cooling said coal gas.

6. The method according to claim 1 which further comprises:

compressing said liquefied coal gas; and reheating said liquefied coal gas until said liquefied coal gas is gasified with said heat extracted from said second portion of said coal gas.

7. A method for continuously supplying fuel gas to a plurality of fuel gas-consuming means in a smelting works having a coal gasification period for producing coal gas and a downtime period and using an iron bath reactor for producing said coal gas via gasification of solid or liquid carbon carriers comprising coal, a fuel gas inlet means for supplying said fuel gas, storage means for storing liquefied fuel gas, a tank for storing liquefied oxygen, oxygen inlet means for supplying gaseous oxygen, an oxygen inlet pipe for providing said liquefied oxygen to said tank, and an oxygen outlet pipe for supplying gasified oxygen to said iron bath reactor from said tank, and wherein said method comprises:

supplying said coal gas produced in said iron bath reactor to said plurality of fuel gas consuming means during said gasification period;

drawing said gaseous oxygen from said oxygen inlet means into said iron bath reactor during said gasification period;

drawing gaseous fuel gas from said fuel gas inlet means during said gasification period;

liquefying said gaseous fuel gas drawn from said fuel gas inlet means by extracting heat from said gaseous fuel gas to form said liquefied fuel gas during said gasification period;

storing said liquefied fuel gas in said storage means during said gasification period;

drawing said liquefied oxygen from said tank during said gasification period;

heating gradually said liquefied oxygen drawn from said tank with said heat extracted from said gaseous fuel gas to form gasified oxygen during said gasification period;

supplying said gasified oxygen to said iron bath reactor during said gasification period;

drawing said gaseous oxygen from said oxygen inlet means during said downtime period;

liquefying said gaseous oxygen drawn from said oxygen inlet means by extracting heat from said gaseous oxygen to form said liquefied oxygen during said downtime period;

storing said liquefied oxygen in said tank during said downtime period;

heating gradually said liquefied fuel gas with said heat extracted from said gaseous oxygen to form a gasified fuel during said downtime period; and supplying said gasified fuel to said plurality of fuel gas consuming means during said downtime period.

8. The method according to claim 7 wherein said heat extracted from said gaseous fuel gas during said gasification period comprises a predetermined quantity of heat equal to that quantity of heat used for heating gradually said liquefied oxygen drawn from said tank during said gasification period.

9. The method according to claim 7 which further comprises:

mixing said fuel gas with said coal gas at a predetermined mixture ratio to form a gas mixture;

liquefying said gas mixture by extracting therefrom a predetermined quantity of heat at a predetermined heat transfer rate; and transferring said predetermined quantity of heat at said predetermined heat transfer rate to said liquefied oxygen drawn from said tank during said gasification period such that said predetermined quantity of heat extracted from said gas mixture equals that quantity of heat necessary to gasify said liquefied oxygen drawn from said tank.

10. The method according to claim 1 further using nitrogen gas and wherein said method further comprises:

extracting said heat from said second portion of said coal gas at a first heat transfer rate different from a second heat transfer rate needed to form said gasified oxygen from said liquefied oxygen; and absorbing or delivering heat with said nitrogen gas at a third heat transfer rate equal to the difference between said first heat transfer rate and said second heat transfer rate.

11. The method according to claim 7 further using nitrogen gas and wherein said method further comprises:

extracting said heat extracted from said gaseous fuel gas at a first heat transfer rate different from a second heat transfer rate needed to form said gasified oxygen from said liquefied oxygen; and absorbing or delivering heat with said nitrogen gas at a third heat transfer rate equal to the difference between said first heat transfer rate and said second heat transfer rate.

12. The method according to claim 1 which further comprises storing said liquefied coal gas in said storage means at the same temperature as said liquefied oxygen stored in said tank.

13. The method according to claim 7 which further comprises storing said liquefied fuel gas in said storage means at the same temperature as said liquefied oxygen stored in said tank.

* * * * *